United States Patent
Faust et al.

(10) Patent No.: US 6,194,597 B1
(45) Date of Patent: Feb. 27, 2001

(54) LIVING CATIONIC POLYMERS PREPARED FROM SILYL-FUNCTIONAL AROMATIC INITIATORS

(75) Inventors: Rudolf Faust, Lexington; Savvas E. Hadjikyriacou, Lowell, both of MA (US); Aroop Kumar Roy; Toshio Suzuki, both of Midland, MI (US)

(73) Assignees: Dow Corning Corporation, Midland, MI (US); University of Massachusetts, Lowell, MA (US)

( * ) Notice: Subject to any disclaimer, the term of this patent is extended or adjusted under 35 U.S.C. 154(b) by 0 days.

(21) Appl. No.: 09/292,333

(22) Filed: Apr. 15, 1999

(51) Int. Cl.$^7$ ...................................................... C07P 7/12
(52) U.S. Cl. ........................... 556/488; 525/284; 526/194
(58) Field of Search ........................... 556/488; 526/194; 525/284

(56) References Cited

U.S. PATENT DOCUMENTS

| | | | |
|---|---|---|---|
| 4,829,130 | 5/1989 | Licchelli | 525/384 |
| 5,247,021 | 9/1993 | Fujisawa et al. | 525/254 |
| 5,260,378 | 11/1993 | Gandini | 525/156 |
| 5,478,899 | 12/1995 | Bening | 526/84 |

FOREIGN PATENT DOCUMENTS

| | | |
|---|---|---|
| 255170 | 2/1988 | (EP) . |
| 379250 | 7/1990 | (EP) . |

OTHER PUBLICATIONS

Chemical Abstracts, vol. 188, No. 6, Feb. 8, 1993, p. 14.
Cationic Polymerizations, p. 184,185, 352, 353 (1996).
Advances in Polymer Science 43, 1, (1982).
Journal of Polymer Science: Part A: Polymer Chemistry, vol. 31, 1531–1542 (1993); Fukui, et al; "Multifunctional Coupling Agents for Living Cationic Polymerization".
Macromolecules 1993, 26, pp. 7315–7321' Fukui, et al; "Multifunctional Coupling Agents for Living Cationic Polymerization".
Polymeric Materials Science and Engineering, vol. 72; Spring Meeting 1995; Wang, et al; "Direct Initiation in Carbocationic Polymerization".
Polymer Preprints, vol. 37, No. 1, Mar. 1996; American Chemical Society; Bae, et al "Carbocationic Coupling Reactions of Living Polyisobutylene Using Coupling Agents".
Macromolecules 1997, vol. 30, pp. 198–203; Bae, et al; "Living Coupling Reaction in Living Cationic Polymerization".
Macromolecules 1996, vol. 29, pp. 1862–1866; Fukui, et al; "Multifunctional Coupling Agents for Living Cationic Polymerization".
Macromolecules 1997, vol. 30, pp. 649–651; Coca, et al; "Coupling Reaction of Oligomeric Polyisobutylene Through a–Isopropenyl Functionality".

Primary Examiner—Bernard Lipman
(74) Attorney, Agent, or Firm—Alex Weitz

(57) ABSTRACT

There is disclosed a method for preparing a silyl-functional living cationic polymer which can be subsequently coupled to form a moisture-curable telechelic system, said method comprising reacting, in the presence of a Lewis acid, (A) at least one cationically polymerizable monomer with
(B) an initiator of the formula

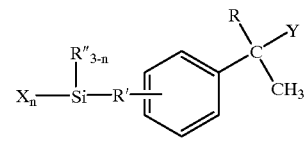

wherein R is selected from H or methyl group, R' is a divalent non-aromatic hydrocarbon group having, 1 to 6 carbon atoms, R" is selected from alkyl groups having 1 to 10 carbon atoms or aryl groups having, 6 to 10 carbon atoms, X is halogen, Y is halogen and n is 1, 2 or 3.

14 Claims, No Drawings

LIVING CATIONIC POLYMERS PREPARED FROM SILYL-FUNCTIONAL AROMATIC INITIATORS

FIELD OF THE INVENTION

The present invention relates to a method for preparing a living cationic polymer. More particularly, the invention relates to a method for synthesizing a living polymer having a silyl-functional head group by reacting a cationically polymerizable monomer in the presence of a Lewis acid using a novel organosilane as the initiator. The resulting living polymer can be coupled to prepare a silyl-functional telechelic polymer.

BACKGROUND OF THE INVENTION

Living anionic polymers are well known in the art but truly living cationic systems have only been developed more recently. By definition, termination and chain transfer rates are zero, or negligible, in such a living polymer so that the concentration of active centers remains approximately constant. Of particular commercial interest are living organic polymers which can be used to prepare telechelic oligomers and macromolecules having hydrolyzable silyl end groups since these can be used to formulate room temperature vulcanizable (RTV), moisture-curable sealants, caulks and adhesives, inter alia. Unlike the well known moisture-curable silicone RTVs, compositions based on polymers having a hydrocarbon backbone offer the advantage of low permeability, making them more suitable for gas barrier applications such as form-in-place gaskets, O-rings, rubber plugs/seals, and the like.

U.S. Pat. No. 4,829,130 to Licchelli et al. discloses a method for preparing silylated copolymers of isobutylene which are crosslinkable upon exposure to moisture. In this case, isobutylene is copolymerized with a comonomer having a vinylic group attached to a silylalkyl group through a benzene ring connecting group. The product of this copolymerization is a polyisobutylene (PIB) having pendant silyl-functional groups along its main chain. However, this method does not teach the preparation of a PIB having terminal silyl functionality or the preparation of a telechelic silyl-functional PIB.

To the contrary, polymers having reactive silyl head groups were described by Kennedy et al. in *Advances in Polymer Science*, 43, 1–50 (1982). These workers discovered that initiators which included an SiCl or SiH group as well as cationogenic moiety could be used to polymerize cationic systems such that the silicon-functional groups survived. The cationogenic moiety studied was the benzyl chloride group (i.e., —$C_6H_4$—$CH_2Cl$) wherein α-methylstyrene was polymerized in the presence of diethyl aluminum chloride as coinitiator. In this case, however, it was observed that the amount of —SiCl detected was only a small fraction of the theoretical, especially when more than one chlorine was present in the head group. Further, although these workers suggest that the SiCl groups may survive polymerization of isobutylene, they did not obtain quantitative confirmation thereof and did not demonstrate the new initiators in connection with this monomer. Thus, Kennedy et al. then turned to the investigation of systems having SiH terminal groups, such polymers being considered more promising intermediates which presented fewer experimental difficulties.

Therefore, there is still a need for compounds which are capable of initiating a cationically polymerizable monomer to prepare a polymer having a reactive silicon-functional head group.

SUMMARY OF THE INVENTION

Applicants have now discovered a novel class of compounds which, unlike the initiators taught by Kennedy et al., cited supra, can initiate cationic polymerization in a controlled manner to provide a polymer having a silicon halide head group. The present invention, therefore, relates to a method for preparing a silyl-functional living cationic polymer, said method comprising reacting, in the presence of a Lewis acid,
(A) at least one cationically polymerizable monomer with
(B) an initiator of the formula

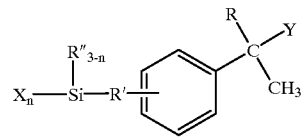

wherein R is selected from H or methyl group, R' is a divalent non-aromatic hydrocarbon group having 1 to 6 carbon atoms, R" is selected from alkyl groups having 1 to 10 carbon atoms or aryl groups having 6 to 10 carbon atoms, X is halogen, Y is halogen and n is 1, 2 or 3.

The invention further relates to the above method wherein the living cationic polymer is subsequently quenched to form a stable product or is reacted in situ with a coupling agent to provide a coupled reactive silyl-functional telechelic polymer.

DETAILED DESCRIPTION OF THE INVENTION

The cationically polymerizable monomers contemplated in the present method include vinyl monomers which can stabilize a cation or propagating center due to the presence of an electron donating group, or by resonance. These can be selected from alkenes, such as isobutylene, butadiene, isoprene, methylbutene, 2-methylpentene; styrenics, such as styrene, p-methylstyrene, α-methylstyrene and indene, inter alia. Alternatively, they can be vinyl ethers, such as isobutyl vinyl ether and methyl vinyl ether. The instant method contemplates the employ of one or more of the above described monomers.

In preferred embodiments of the present method, at least one monomer is selected from isobutylene, isoprene or a styrenic monomer. Preferably, at least 50 mole percent, and more preferably 80 mole percent, of the monomer used in the cationic polymerization is isobutylene. Most preferably, the entire monomer is isobutylene, this resulting in a living polyisobutylene (PIB) homopolymer.

The reactive silyl-functional initiator (B) of the present invention is represented by the formula (i)

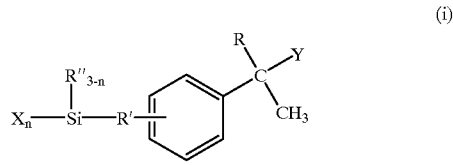

wherein R is selected from H or methyl group, R' is a divalent non-aromatic hydrocarbon group having 1 to 6 carbon atoms, R" is selected from alkyl groups having 1 to 10 carbon atoms or aryl groups having 6 to 10 carbon atoms, X is halogen, Y is halogen and n is 1, 2 or 3. Specific examples of R" include methyl, ethyl, propyl, isopropyl, n-butyl, isobutyl, n-octyl, 2-ethylhexyl, n-nonyl, n-decyl, phenyl and tolyl, methyl being preferred. The group R' is exemplified by —$CH_2$—, —$CH_2$—$CH_2$—, —$CH_2CH_2CH_2$—, —$CH_2$—$C(Me)_2$— and —$CH_2$=$CH_2$—, and is preferably —$CH_2CH(Me)$—, in wherein Me hereinafter represents a methyl group. Specific examples of X and Y are fluorine, chlorine, bromine and iodine. Further, the moieties attached to the benzene ring may be in ortho, meta or para positions with respect to one another, the latter two isomers being preferred. Preferably, X and Y are chlorine and n is 2 or 3.

In a highly preferred embodiment of the instant method, the initiator has the formula

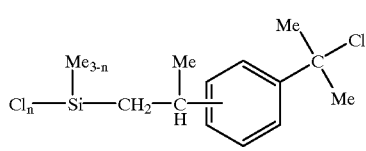

(ii)

wherein n is 2 or 3.

The initiators of the present invention can be prepared by first carrying out a hydrosilation reaction between a dialkenyl benzene species (or an alkenyl-alkynyl benzene species) and a halosilane, as illustrated below for a preferred system wherein R' is —$CH_2CH(Me)$—:

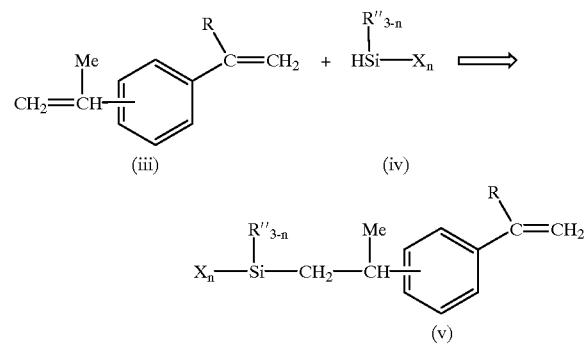

in which R, R", X and n are as defined above in connection with formula (i). In the above hydrosilation reaction, the molar ratio of component (iii) to component (iv) can be 0.3 to 10 but is preferably more than 1. More preferably, the ratio is 1 to 3. After the hydrosilation reaction, separation of the desired product (v) by a suitable method, such as fractional distillation, is recommended. In this case, it is highly recommended that a radical scavenger, such as phenothiazine, be added to the mixture to prevent polymerization of the product and starting materials.

Suitable catalysts for the hydrosilation reaction are platinum black, platinum metal on various solid supports (e.g., carbon), chloroplatinic acid, alcohol solutions of chloroplatinic acid, and complexes of chloroplatinic acid with liquid ethylenically unsaturated compounds such as olefins and organopolysiloxanes containing ethylenically unsaturated hydrocarbon radicals bonded to silicon. Preferred catalysts include a platinum complex catalyst produced by reacting chloroplatinic acid and divinyltetramethyldisiloxane, prepared according to U.S. Pat. No. 3,419,593 to Willing and a neutralized complex of platinous chloride and divinyltetramethyldisiloxane, prepared according to U.S. Pat. No. 5,175,325 to Brown et al., these patents being hereby incorporated by reference. Most preferably, this catalyst is a neutralized complex of platinous chloride and divinyltetramethyldisiloxane. For this synthesis, the hydrosilation catalyst is generally employed at a level equivalent to a platinum concentration of from 0.1 to 1,000 parts by weight of platinum metal, preferably from to 1 to 100 parts by weight of platinum metal, per million weight parts (ppm) of the unsaturated component (ii).

After the hydrosilation reaction is carried out, synthesis of the initiator according to the present invention may be completed by hydrohalogenating structure (v) (illustrated for the case in which R' is —$CH_2CH(Me)$— and Y is Cl):

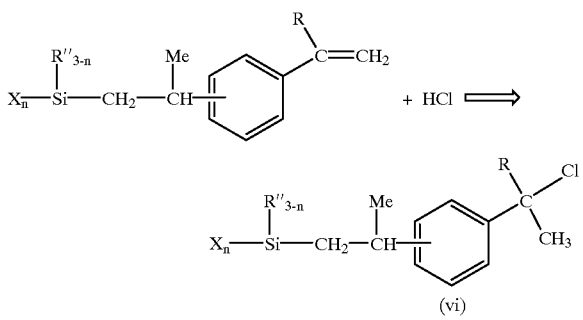

wherein R, R", X and n have their previously defined meanings. In the above hydrohalogenation reaction, the acid is typically added in excess.

Alternatively, the initiator may be prepared by a conventional Grignard synthesis (e.g., dicumyl chloride can be reacted with Mg followed by reaction with $MeSiCl_3$).

The Lewis acid, employed as a co-initiator in the present method, is of the type known to catalyze at least one cationic living polymerization. Examples of such Lewis acids include $BZ_3$, $TiZ_4$, $AlZ_3$, $SnZ_4$ and $ZnZ_2$, inter alia, wherein Z is independently selected from the group consisting of halogen, alkoxy having 1 to 4 carbon atoms and alkyl having 1 to 4 carbon atoms. Preferably Z is halogen, most preferably chlorine. Of course, those skilled in the art will recognize that a compound such as $TiZ_4$ in which all of the Z groups are alkyl groups is not a useful catalyst for cationic living polymerization and such compounds are not contemplated herein. The interested reader is referred to the article by Matyjaszewski and Pugh in *Cationic Polymerization Mechanism, Synthesis and Applications,* Matyjaszewski, Ed.; Marcel Dekker, New York (1996), for a review of suitable Lewis acids. Preferably, the Lewis acid is selected from $TiCl_4$ or a mixture of $BCl_3$ and $BBr_3$.

In order to prepare a living cationic polymer according to the instant method, at least one monomer (A) is polymerized with an initiator of the formula (i) in the presence of a Lewis acid. Additionally, a Lewis base, such as pyridine or its derivatives, such as 2,6-ditert-butyl-pyridine (DTBP) or lutidine, is preferably included in this polymerization reaction in order to prevent initiation by protic impurities. Such cationic living polymerizations are well known in the art, including typical reaction conditions and proportions of the monomer(s), initiator, Lewis acid, etc. This polymerization is preferably run in a dry organic solvent solution (e.g., hexane, methylene chloride, methyl chloride, toluene, and combinations thereof). Of course, these conditions will vary according to the particular ingredients under consideration and optimization of conditions and proportions needed to obtain a particular living polymer having a desired molecular weight can be achieved through routine experimentation by those skilled in the art. For example, the interested reader is directed to the chapter by Sawamoto in *Cationic Polymerization Mechanism, Synthesis and Applications*, Matyjaszewski, Ed.; Marcel Dekker, New York (1996) and the text by Kennedy and Ivan entitled *Designed Polymers by Carbocationic Macromolecular Engineering: Theory and Practice* published by Hanser (1992).

In a preferred embodiment, isobutylene (IB) is reacted with an initiator according to formula (ii) in the presence of TiCl$_4$. This reaction is carried out in a solvent, preferably a combination of methyl chloride and hexanes in a volume ratio of about 60/40 to 40/60, as well as in the presence of a Lewis base, such as DTBP, under dry conditions and at a temperature of –100 to 0° C., preferably –80° C. to –60° C. Preferably, the order of addition is solvent, Lewis base, Lewis acid, initiator and monomer. The concentrations of the initiator and TiCl$_4$ are preferably about $10^{-3}$ to $10^{-1}$ molar (M) and $10^{-3}$ to $10^{-2}$M, respectively, based on the total solution, while the molar content of DTBP is adjusted to be equal or greater than that of protic impurity.

When the above described polymerization procedure is deemed complete, preferably when monomer conversion is at least 98%, the resulting living polymer may be quenched with, e.g., pyridine, to provide a stable polymer having

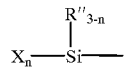

head groups, wherein R", X and n have their previously defined meanings. Alternatively, the living polymer may be quenched with an alcohol, preferably having 1 to 4 carbon atoms, to form a similar stable polymer wherein the X groups are replaced with the corresponding alkoxy group. For example, when methanol is the quenching agent, the SiX functionality undergoes methanolysis and the resulting polymer has a head group of the structure

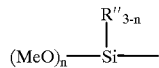

wherein R" and n have their previously defined meanings.

Another aspect of the present invention relates to a method for preparing telechelic polymers of the type A—A and AB-BA, inter alia, wherein A and B represent different polymer blocks. These structures are obtained by coupling two of the above described cationic living polymers of the type A$^+$ or AB$^+$, respectively. Such a coupling preferably doubles the molecular weight of the living polymer to provide a silyl-functional telechelic polymer. This may be accomplished by reacting the living polymer with a compound known in the art to couple such cationic systems.

For example, non-ionic coupling agents, such as bifunctional silyl enol ethers can be employed in the coupling of short living chains of poly(isobutyl vinyl ether). In-situ coupling of living polyisobutylene (PIB) can be carried out using a bis-diphenylethylenes (bis-DPE) such as 2,2-bis{4-(1-phenylethenyl)phenyl}propane and 2,2-bis{4-(1-tolylethenyl)phenyl}propane where the two DPE moieties are separated by a spacer group (Bae et al. in *Macromolecules*, 30, 198, (1997)). Also, coupling of oligomeric polyisobutylene can be accomplished through ω-isopropenyl functionality (—CH$_2$C(CH$_3$)═CH$_2$) using catalytic amounts of triflic acid (CF$_3$SO$_3$H) in hexanes at –80° C. (Coca et al. in *Macromolecules*, 30, 649 (1997)).

Preferably, the coupling agent is an organic compound having at least 2 furan rings in its molecule and the coupling reaction takes place in the presence of a Lewis acid of the type described supra. An example of this agent is

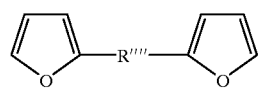

(vii)

wherein R"" is a straight chain or branched alkylene group having 1 to 10 carbon atoms, preferably at least 2 carbon atoms, which may also contain cyclic structures such as aromatic rings, furan rings, and the like, in either pendant positions or in the alkylene chain. Preferably, the furan coupling agent has the structure

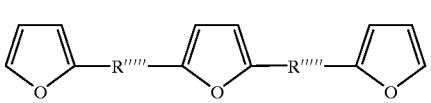

(viii)

wherein R"" is independently selected from alkylene groups having 1 to 10 carbon atoms. Specific preferred coupling agents are represented by the following structures:

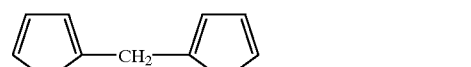

difuranylmethane (DFM),

2,2-difuranylpropane (DFP),

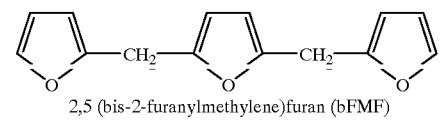

2,5 (bis-2-furanylmethylene)furan (bFMF)

and

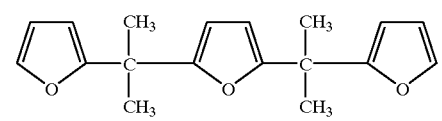

bis(2-furanyl-isopropyl)-furan (bFPF)

bFMF and bFPF being preffered.

The coupling reaction using the furan compounds is typically carried out in an organic solvent solution such as would ordinarily be used to conduct the actual cationic polymerization. Optimum reaction conditions for a given set of components can be determined by those skilled in the art through routine experimentation, but coupling is typically accomplished at a temperature of about –80° C. to about 40° C. It will be recognized, however, that this temperature will greatly depend upon the particular living polymer under consideration. For example, in the case of the preferred polyisobutylene living cationic polymers, this temperature is preferably –80° C. to –60° C. A stoichiometric amount of the furan coupling agent relative to the concentration of living chain ends is preferred, however, a slight excess of the coupling agent over this stoichiometric equivalent amount of coupling agent for each mole of chain end can be used. It is further contemplated that the coupling reaction can be accomplished in the same vessel used for the polymerization and the solvents, as well as Lewis acid used in the former reaction, can be retained during the coupling reaction (i.e., a one-pot procedure).

In a preferred embodiment wherein the Lewis acid is TiCl$_4$ and the living polymer is PIB, the Lewis acid is typically added at a level of at least two times the living polymer concentration (molar basis). In general, optimum Lewis acid levels employed will depend on such factors as Lewis acid type, monomer type and solvent type, inter alia. Typically, the Lewis acid content is already in the above recited range (i.e., from the preparation of the living polymer) and further addition thereof is not necessary.

There is no critical order of addition of the components for the coupling according to the present invention. In a typical procedure, the furan compound and Lewis acid (if a sufficient amount is not provided during the polymerization step) are added to a solution of the living polymer.

When the highly preferred agent bFPF is employed to couple living polyisobutylene, the coupling efficiency is generally quite high and the number average molecular weight of the PIB is essentially doubled, within experimental error (i.e., quantitative coupling).

After completion of the coupling reaction, as indicated by molecular weight increase or depletion of coupling agent, the resulting polymer may be isolated by conventional techniques, such as precipitation from solution by the addition of a poor solvent for the polymer.

When the preferred silyl-functional PIB living polymer is coupled with the above described furan compounds (vii) or (viii), one obtains telechelic PIB polymers having the respective formulas

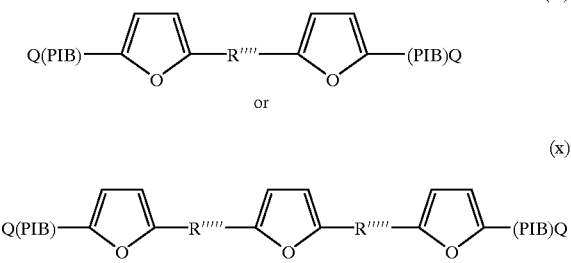

wherein R"" and R'"" are defined above, PIB represents the polyisobutylene chain residue and Q is a moiety which contains the functional silyl group introduced by the initiator having the formula

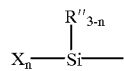

wherein R", X and n have their previously defined meanings. As described above, these halogen-functional silyl groups can be converted to the corresponding alkoxy-functional silyl groups by reaction with an alcohol to provide the above telechelic polymers wherein the end groups have the formula

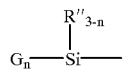

in which R" and n are as defined above and G is an alkoxy group, preferably having 1 to 4 carbon atoms, most preferably methoxy.

The silyl-functional cationic living polymers of the present invention find utility as a filler treatment or in the modification of solid surfaces (e.g., as a hydrophobing agent).

When the above living systems are coupled to provide telechelic polymers, the latter can be cured by exposure to moisture and can therefore be employed as base polymers in the formulation of sealants, adhesive and coatings when combined with the appropriate catalysts, inter alia. Those skilled in the art will, of course, appreciate that at least one crosslinker would be necessary to obtain a cured system when there is only one reactive group on silicon (i.e., when n=1 in the above formulae). When cured, these formulated compositions can be used as form-in-place gaskets, seals for insulating glass, and the like.

EXAMPLES

The following examples are presented to further illustrate the method of this invention, but are not to be construed as limiting the invention, which is delineated in the appended claims. All parts and percentages in the examples are on a weight basis and all measurements were obtained at 25° C. unless indicated to the contrary.

Example 1

Hydrosilylation of 1,3-diisopropenylbenzene

A 250 ml three neck round bottom reaction flask equipped with a thermometer, a condenser, a magnetic stirring bar, an addition funnel and argon gas inlet was charged with 60 ml of 1,3-diisopropenylbenzene (0.35 mole). This was followed by the addition (under argon) of 0.2 ml of a 10% solution of a platinum divinyldisiloxane complex in hexanes. This complex was SIP 6830.0 obtained from Gelest (Tullytown, Pa.) and contained 3–3.5% Pt in vinyl terminated polydimethylsiloxane. After injection of the catalyst, the argon inlet was replaced by a drying tube that contained Drierite™.

The reaction flask was warmed to 40° C. in an oil bath and a dropwise feed of CH$_3$Cl$_2$SiH (30 ml; 0.29 mole) from the addition funnel was started. The reaction temperature was kept between 40° C. and 50° C. during feeding by adjusting the rate of addition of CH$_3$Cl$_2$SiH and heat to the oil bath. After the addition, the temperature was kept at the above level for another 3 hours.

The flask was allowed to cool to room temperature and the addition funnel, the drying tube and the thermometer were removed and the condenser was replaced by a distillation head and argon inlet. Excess 1,3-diisopropenylbenzene was distilled out, followed by the distillation of the expected material 1-isopropenyl-3-(1-dichloromethylsilylmethyl) ethyl-benzene,

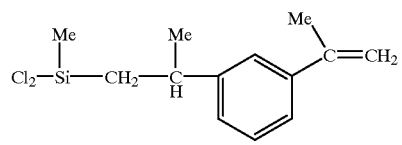

the structure of which was confirmed by $^1$H NMR (nuclear magnetic resonance).

Example 2

Hydrochlorination of 1-isopropenyl-3-(1-dichloromethylsilylmethyl)ethyl-benzene

The above prepared 1-isopropenyl-3-(1-dichloromethylsilylmethyl)ethyl-benzene (5 ml) was dissolved in 100 ml of dried and distilled CH$_2$Cl$_2$ and cooled to 0° C. Dry HCl, generated by the reaction of NaCl and $H_2SO_4$, was bubbled through the solution for 5 hours. The solution was allowed to warm to room temperature and excess HCl was allowed to escape. Most of the solvent was evaporated on a Rotavap™ and the last traces were removed by attaching a vacuum pump. Characterization by $^1$H NMR spectroscopy confirmed quantitative hydrochlorination of a product having the structure

INITIATOR 1

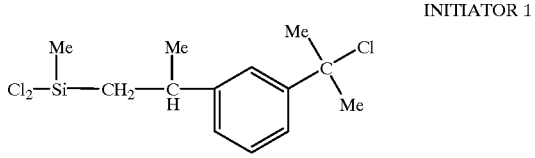

Example 3

Synthesis of the coupling agents 2,2-difuryl-propane (DFP) and 2,5-bis-(2-furyl-propyl)-furan (bFPF)

Furan (50 ml, 46.8 g) and acetone (25 ml, 19.7 g) were placed into a three neck 250 ml flask equipped with a condenser, an addition funnel and a magnetic stirring bar. The mixture was cooled to 0° C. by means of an ice-bath. While stirring, 10 ml of concentrated HCl (37%) were added dropwise. After the HCl addition, the ice bath was removed allowing the temperature of the reaction mixture to rise to room temperature and the system was stirred for an additional 3 hours. The mixture was then diluted with an equal volume of hexanes and washed until neutral with 10% aqueous sodium carbonate ($Na_2CO_3$) solution followed by distilled water. The mixture was left overnight over drying agent ($Na_2SO_4$).

The next day 24 g of 2,2-difuryl-propane (DFP) and 6 g of 2,5-bis-(2-furyl-propyl)-furane (bFPF) were recovered by distillation under vacuum. The bFPF was further purified by recystallization from methanol to give white needles having a melting point of 47° C.–48° C. $^1$HNMR analysis confirmed the target compounds.

Example 4

Polymerization of Isobutylene (IB) Followed by in-situ Coupling of the Living Polymer Into a 250 ml two neck round bottom flask cooled to −80° C. were placed 34 ml of hexanes (measured at room temperature). After being cooled down to the reaction temperature, 34 ml (measured at −80° C.) of $CH_3Cl$ were stirred in. A solution of 0.1 ml of 2,6-ditert-butyl-pyridine (DTBP) in 10 ml of hexanes which had been cooled to −80° C. was added next, followed by a solution of 1.02 ml of $TiCl_4$ in a mixture of 10 ml hexanes and 10 ml $CH_3Cl$. The mixture was stirred for five minutes and 0.7192 g of INITIATOR 1 synthesized in Example 2 was introduced as a solution in 20 ml hexanes that was also kept at −80° C. This was immediately followed by the addition of 6.4 ml of isobutylene (IB), the latter then being polymerized over a period of 40 minutes to form a living system. A 20 ml sample of the resulting cationic living polymer was removed and quenched with anhydrous methanol to provide a control polymer. Upon quenching, the chloro-groups on silicon underwent methanolysis, as evidenced by a methoxy peak at 3.5 ppm in the $^1$H NMR spectrum. This control was purified by precipitation from hexanes/methanol under $N_2$ and traces of solvents were removed under vacuum (overnight). Characterization by gel permeation chromatography (GPC) showed a number average molecular weight ($M_n$) of 3,400 and a polydispersity (PD) of 1.31 while $^1$H NMR indicated $M_n$ was 3,100, the latter value being considered more reliable. The theoretical $M_n$ of the quenched polymer was 2,600.

A solution of 0.2263 g of 2,5-bis-(2-furyl-propyl)-furane (bFPF) in 6 ml of $CH_3Cl$ was added to the remaining living polymer solution (when conversion was close to 100%). The reaction was also quenched with excess anhydrous methanol after 120 minutes to neutralize the Lewis acid.

Final molar concentrations of the reactants (based on the total solution) were as follows:

INITIATOR $1=2\times10^{-2}$M; DTBP=$3.8\times10^{-3}$M; $TiCl_4=8\times10^{-2}$M; IB=0.71M; bFPF=$8.3\times10^{-3}$M.

The coupled polyisobutylene (PIB) polymer was purified and devolatilized, as described above. Its $M_n$ as determined by GPC had increased to 5,400 (PD=1.43). Further, $^1$H NMR spectroscopy indicated that the chloride chain ends completely disappeared during the coupling reaction. Coupling however was not quantitative and remained at ~80%, some mono-addition of PIB chains being observed in the NMR spectrum.

Example 5

Crosslinking of the Coupled Polymer

The telechelic PIB prepared in Example 4 (1.0711 g) was mixed with 0.0546 g of tin octoate (tin-2-ethylhexanoate) and one drop of water in a 50 ml beaker. The mixture was stirred manually to give a cured white homogeneous elastomeric mass which was then allowed to stand for 72 hours. Hexanes (30 ml) were added and the combination was agitated using a magnetic stirrer for another 72 hours. The resulting swelled polymer was separated from the solvent and the solvent was evaporated. The amount of the residue from the evaporation was negligible, indicating that the crosslinking was essentially quantitative.

Example 6

Polymerization of Isobutylene (IB) Followed by in-situ Coupling of the Living Polymer The procedures of Example 4 were repeated in an effort to increase the coupling efficiency. Into a 250 ml two neck round bottom flask cooled to −80° C. were placed 37.7 ml of hexanes (measured at room temperature). After being cooled down to the reaction temperature, 36.1 ml (measured at −80° C.) of $CH_3Cl$ were stirred in. A solution of 0.1 ml of DTBP in 10 ml of hexanes (measured at −80° C.) was added next, followed by a solution of 1.07 ml of $TiCl_4$ in a mixture of 10 ml hexanes and 10 ml $CH_3Cl$. The mixture was stirred for five minutes and 0.7550 g of INITIATOR 1 synthesized in Example 2 was introduced as a solution in 20 ml hexanes that was also kept at −80° C. This was immediately followed by the addition of 6.7 ml of isobutylene (IB), the latter then being polymerized over a period of 40 minutes to form a living system. All solutions were cooled to −80° C. prior to addition to the reaction flask. Final molar concentrations of the reactants during IB polymerization (based on the total solution) were as follows:

INITIATOR $1=2\times10^{-2}$M; DTBP=$3.8\times10^{-3}$M; $TiCl_4=8\times10^{-2}$M; IB=0.71M;

When conversion was close to 100%, the above reaction mixture was divided into four 25 ml samples, each being placed in a culture tube. The contents of tube #1 were quenched with anhydrous methanol and the product purified as before to provide a control polymer having GPC $M_n$ of 2,700. A solution of 0.0532 g of 2,5-bis-(2-furyl-propyl)-furane (bFPF) in 4.0 ml of $CH_3Cl$ was added to tube #2 and a similar solution of bFPF was added to each of the remaining three tubes to provide the concentrations of coupling agent shown in Table 1. The samples were also quenched with excess anhydrous methanol after 120 minutes and purified as described above. Resulting coupled polymers had the molecular weights indicated in Table 1.

| | | |
|---|---|---|
| Culture Tube #2 | bFPF = 7.49 × 10⁻³M | $M_n$ = 4,800 (polydispersity = 1.32) |
| Culture Tube #3 | bFPF = 8.05 × 10⁻³M | $M_n$ = 4,500 |
| Culture Tube #4 | bFPF = 8.62 × 10⁻³M | $M_n$ = 4,200 |

From the above table, it is seen that a near quantitative coupling resulted (i.e., coupling efficiency was approximately 90%) when the coupling agent concentration was $7.49 \times 10^{-3}$M.

(Comparative) Example 7

Preparation of 4-(2-dichloromethylsilyl-ethyl)benzyl chloride

A 250 ml round bottom reaction flask equipped with a magnetic stirrer, a condenser, an addition funnel and a thermometer under argon was charged with 29.1 ml of vinylbenzyl chloride (a 96% pure mixture of m and p isomers; obtained as #42253-1000 from ACROS Corp. (Pittsburgh, Pa.) and 0.2 ml of platinum catalyst (platinum divinyl tetramethyldisiloxane 10% solution in hexanes, #SIP 6830.0 from Gelest). Dichloromethylsilane ($Cl_2CH_3SiH$) (26.6 ml; 0.25 mole) was placed in the addition funnel, the argon supply was interrupted and a drying tube was attached to the condenser. The reaction flask was heated in an oil bath to 50° C. and a dropwise addition of $Cl_2CH_3SiH$ was started. By adjusting the rate of addition and the heating, the temperature of the system was kept between 45–55° C. After the addition was over the temperature was maintained between 45–55° C. for 3 additional hours. The argon supply was reconnected and the reaction was cooled to room temperature. The condenser, thermometer and the addition funnel were replaced by a distillation head and the product was purified by vacuum distillation. The purified product was obtained at a yield >90% and its structure was confirmed by $^1H$ NMR as

INITIATOR 2

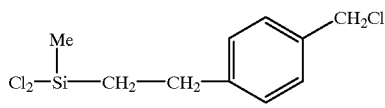

This product is an isomer of Initiator No. 2 disclosed by Kennedy et al. (Table 1), cited supra.

(Comparative) Example 8

Polymerization of isobutylene using 4-(2-dichloromethylsilyl-ethyl)benzyl chloride as initiator INITIATOR 2, prepared according to (Comparative) Example 7, was used to polymerize IB under identical conditions to those used in Example 4. Final molar concentrations of the reactants (based on the total solution) were identical during the polymerization phase. It was observed that the conversion of IB was very low (only 16.3% in 40 minutes) and GPC clearly indicated the low efficiency of this initiator. Thus, at this conversion, the experimental $M_n$ was 47,000 (relative to a theoretical $M_n$ of 2,000 at 100% conversion). This result was verified by $^1H$ NMR spectroscopy. Resonances due to unreacted initiator were clearly visible in the $^1H$ NMR spectrum. Due to the high boiling point of INITIATOR 2, it did not evaporate during drying under vacuum. Molecular weight could not be controlled using this initiator and no attempt to couple the high molecular weight living polymer was made.

That which is claimed is:

1. A method for preparing a silyl-functional living cationic polymer, said method comprising reacting, in the presence of a Lewis acid,
   (A) at least one cationically polymerizable monomer with
   (B) an initiator of the formula

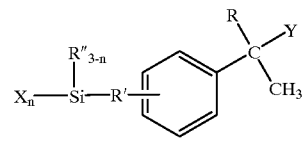

wherein R is selected from H or methyl group, R' is a divalent non-aromatic hydrocarbon group having 1 to 6 carbon atoms, R" is selected from alkyl groups having 1 to 10 carbon atoms or aryl groups having 6 to 10 carbon atoms, X is halogen, Y is halogen and n is 1, 2 or 3.

2. The method according to claim 1, wherein said cationic living polymer is quenched to form a stable product.

3. The method according to claim 1, wherein said monomer is at least one monomer selected from the group consisting of isobutylene, isoprene and a styrenic monomer and wherein X is chlorine, Y is chlorine and R' is —$CH_2CH$(Me)— in which Me denotes methyl.

4. The method according to claim 3, wherein said monomer is isobutylene and said initiator has the structure

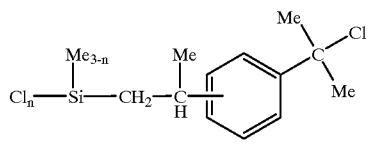

in which Me represents a methyl group and n is 2 or 3.

5. The method according to claim 1, further comprising reacting said cationic living polymer with a coupling agent to form a coupled polymer.

6. The method according to claim 5, wherein said coupling agent has a formula selected from

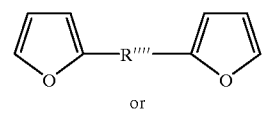

or

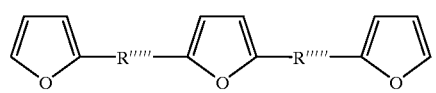

in which R'''' and R''''' are independently selected from alkylene groups having 1 to 10 carbon atoms.

7. The method according to claim 6, wherein said monomer is at least one monomer selected from the group consisting of isobutylene, isoprene and a styrenic monomer and wherein X is chlorine and Y is chlorine.

8. The method according to claim 7, wherein said monomer is isobutylene and said initiator has the structure

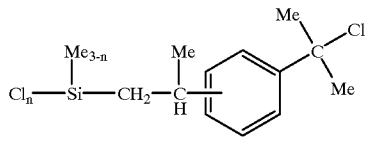

in which Me represents a methyl group and n is 2 or 3.

9. The method according to claim 8, wherein said coupling agent is selected from the group consisting of 2,5(bis-2-furanylmethylene)furan and bis(2-furanyl-isopropyl)-furan.

10. The method according to claim 5, further comprising reacting said coupled polymer with an alcohol.

11. The method according to claim 8, further comprising reacting said coupled polymer with an alcohol.

12. A compound having the formula

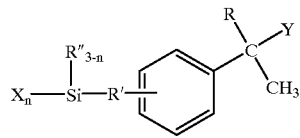

wherein R is selected from H or methyl group, R' is a divalent non-aromatic hydrocarbon group having 1 to 6 carbon atoms, R" is selected from alkyl groups having 1 to 10 carbon atoms or aryl groups having 6 to 10 carbon atoms, X is halogen, Y is halogen and n is 1, 2 or 3.

13. The compound according to claim 12, wherein X is chlorine, Y is chlorine and R' is —$CH_2CH(Me)$— in which Me denotes methyl.

14. The compound according to claim 12 having the structure

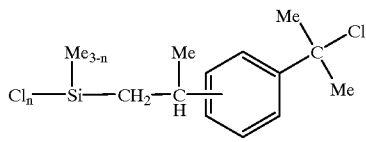

in which Me represents a methyl group and n is 2 or 3.

* * * * *